Patented Jan. 30, 1940

2,188,878

UNITED STATES PATENT OFFICE 2,188,878

PROCESS OF PREPARING CRYSTALLIZED DERIVATIVES OF THE VITAMIN E

Carl Ludwig Lautenschlager and Fritz Lindner, Frankfort-on-the-Main, Germany, assignors to Winthrop Chemical Company, Inc., New York, N. Y., a corporation of New York No Drawing. Application December 1, 1936, Serial No. 113,724. In Germany December 4, 1935

3 Claims. (Cl. 260—482)

The present invention relates to a process of preparing crystallized derivatives of the vitamin E.

The antisterility vitamin E has hitherto not been obtained in a crystallized form. A crystallized allophanate of the vitamin E which was obtained by means of cyanic acid is briefly described in the literature (Journal of Biological Chemistry, vol. 113, page 319). Particular statements relating to its preparation have not been known.

According to our experiences the isolation of a crystallized allophanate by the usual methods succeeds only when there is started from vitamin E preparations which have been pre-purified to a very large extent by a repeated chromatographic separation, a high vacuum distillation or other complicated processes. In consequence thereof the preparation of the crystallized vitamin E allophanate according to this process is extraordinarily unprofitable and difficult.

Now we have found a process which permits the isolation of pure vitamin E preparations without the complicated pre-purification mentioned above of the starting materials. The process consists in dissolving the raw extracts, for instance, raw extracts from wheat oil, cotton-seed oil or rice oil containing the vitamin E after they have been caused to react with an agent having an esterifying action, in an indifferent organic solvent and treating this solution with a suitable adsorbing substance, for instance, calcium hydroxide, aluminium hydroxide, fibrous alumina, kaolin or the like. During this process there is preferably adsorbed the ester of the vitamin E while the non-crystallized impurities remain in the dissolved state. By a treatment of the adsorbate with a suitable solvent the purified ester may be isolated.

The process may, for instance, be carried out in the following manner: the reaction products of the raw materials with cyanic acid are dissolved, for instance, in petroleum ether, the solution is filtered with suction through a column filled with the adsorbing agent, for instance aluminium oxide, and is thoroughly washed with the solvent used. The column containing the vitamin E allophanate is then treated with the solvent which consists, for instance, of a mixture of methyl alcohol and ether, whereby the vitamin E allophanate is eluted. The mixture of allophanate obtained may readily be obtained from methyl alcohol in a fractionated crystallized form. Two isomeric crystalline allophanates are obtained thereby.

The process is not limited only to vitamin E allophanates. It may also be applied with the same or with a similar effect to other esters of the vitamin E obtained by a reaction with acid chlorides, for instance, naphthoyl chlorides, anhydrides, isocyanates and other adjuvants having a similar action. The solvents used are selected according to the solubility of the vitamin E preparations which are applied and is ascertained by a preliminary test.

The following examples serve to illustrate the invention but they are not intended to limit it thereto:

(1) 10 grams of a vitamin E preparation obtained by the removal of the chief quantity of the sitosterol contained in the unsaponifiable substance of wheat oil, are dissolved in 250 cc. of dry petroleum ether. Into this solution there is introduced, while strongly cooling, the cyanic acid evolved from 30 grams of cyanuric acid. After the whole has been allowed to stand over night it is dried and extracted with ether. The residue of the ether solution is introduced into 100 cc. of light petrol, a small quantity of sitosterol-allophanate remaining undissolved. The solution is now filtered with suction through a column of aluminium oxide having a diameter of about 2 centimeters and a height of about 15 centimeters and is washed with 500 cc. of light petrol. It is sucked until dry and eluted with a mixture of methyl alcohol and ether in the proportion of 4 to 1. After the solution has been concentrated a sparingly soluble allophanate melting at 160° C. firstly crystallizes and from the mother liquor, after a further concentration, a more readily soluble isomeric allophanate melting at 135° C. to 138° C. The alcohol obtained by a saponification from the allophanate melting at 160° C. has the formula $C_{29}H_{50}O_2$ and contains in 2 to 3 milligrams 1 rat unit.

(2) 10 grams of a vitamin E preparation, obtained by the removal of the main quantity of the unsaponifiable substance of cotton-seed oil, are dissolved in pyridine and the solution is esterified by heating it on the vapor bath with a benzene solution of beta-naphthoyl chloride. The reaction mixture is introduced into petroleum ether, washed first with water then with dilute sulfuric acid and finally with dilute caustic soda solution, filtered and dried. The solution is further treated as described in Example 1. A sparingly soluble ester melting at 156° C. and a readily soluble ester melting at 134° C. are obtained from which there may be obtained by a saponification highly active vitamin E preparations.

We claim:

1. A process which comprises treating a raw concentrate of vitamin E with cyanuric acid, drying the solution thus obtained, dissolving the dry substance in an organic solvent, causing an adsorbing agent to act upon this solution and eluting the adsorbed substance by another organic solvent.

2. A process which comprises treating a raw concentrate of vitamin E with cyanuric acid, drying the solution thus obtained, dissolving the dry substance in an organic solvent, leading the solution through a column filled with an adsorbing agent and eluting the adsorbed substance by another organic solvent.

3. A process which comprises treating a raw concentrate of vitamin E with cyanuric acid, drying the solution thus obtained, dissolving the dry substance in an organic solvent, leading the solution through a column filled with aluminium oxide and eluting the adsorbed substance by another organic solvent.

CARL LUDWIG LAUTENSCHLAGER.
FRITZ LINDNER.